United States Patent [19]
Cortes

[11] Patent Number: 6,098,493
[45] Date of Patent: *Aug. 8, 2000

[54] AERO HANDLE AND SUPPORT SYSTEM FOR BICYCLES

[76] Inventor: Hector Cortes, 11801 Rainey Meadow Ln., San Antonio, Tex. 78233

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,949

[22] Filed: May 31, 1997

[51] Int. Cl.[7] .............................. B62K 21/12; F16B 1/00
[52] U.S. Cl. ..................... 74/551.8; 74/551.1; D12/178; 403/205; 403/382
[58] Field of Search ............................... 74/551.1–551.8; 280/261, 288.4; 403/205, 382; D12/114, 178

[56] References Cited

U.S. PATENT DOCUMENTS

| | | |
|---|---|---|
| D. 366,015 | 1/1996 | McCormack ......................... D12/114 |
| D. 397,069 | 8/1998 | Newkirk ............................... D12/178 |
| D. 397,965 | 9/1998 | Ebeyer .................................. D12/114 |
| 5,000,469 | 3/1991 | Smith ...................................... 280/261 |
| 5,138,893 | 8/1992 | Coperland ............................ 74/551.1 |
| 5,145,210 | 9/1992 | Lennon ............................. 74/551.8 X |
| 5,154,094 | 10/1992 | Klieber ................................. 74/551.1 |
| 5,154,095 | 10/1992 | Giard ................................... 74/551.8 |
| 5,195,394 | 3/1993 | Latta ..................................... 74/551.8 |
| 5,197,350 | 3/1993 | Borromeo ............................ 74/551.8 |
| 5,201,243 | 4/1993 | Schneider .......................... 74/551.3 X |
| 5,235,871 | 8/1993 | Yamazaki et al. ..................... 74/551.8 |
| 5,319,994 | 6/1994 | Miller .................................... 74/551.8 |
| 5,326,122 | 7/1994 | Duffy ................................... 280/288.4 |
| 5,425,285 | 6/1995 | Cheng .............................. 74/551.3 X |
| 5,429,013 | 7/1995 | Taylor et al. ......................... 74/551.1 |
| 5,660,085 | 8/1997 | Tamplin ............................... 74/551.3 |
| 5,899,117 | 5/1999 | Newkirk ........................... 74/551.1 X |

FOREIGN PATENT DOCUMENTS

| | | | |
|---|---|---|---|
| 2668745 | 5/1972 | France ................................. 74/551.8 |
| 4022434 A1 | 1/1992 | Germany ............................ 74/551.8 |
| WO 91/04903 | 10/1990 | WIPO ................................. 74/551.8 |

Primary Examiner—Vinh T. Luong

[57] ABSTRACT

In combination with a bicycle handlebar having a crossbar portion connected to a bicycle stem, a handle and torso support assembly, including: (1) a pair of handle extensions having a handle clamp affixed at one end of each handle extension, and (2) clamping means for securing the handle clamps to the crossbar portion, the handle extensions extending rearwardly and upwardly to a region rearward from the crossbar portion to define a rider position whereby the rider's hands are located under the rider's upper torso when steering a bicycle using the handle extensions. The handle and torso assembly further includes a torso support extension that is secured to the crossbar portion with a torso clamp. Thus, the handle and torso support extensions provide for a bicycle rider to assume an aerodynamic forward leaning rest position in which his silhouette is minimized while conserving energy.

10 Claims, 6 Drawing Sheets

AERO HANDLE AND SUPPORT SYSTEM FOR BICYCLES

BACKGROUND OF THE INVENTION

The present invention relates to a handle & torso support assembly for steering a bicycle which specifically enables a cyclist to assume a forward leaning rest position for greater and more efficient aerodynamics when riding a bicycle.

In order to enable a cyclist to increase his speed and conserve energy while bicycle racing, the world of bicycle racing has been on endless search for improved aerodynamics. To this end, the most effective invention to obtain efficient aerodynamics on a bicycle has been the aero-type handle bars. (U.S. Pat. No. 4,750,754). In the aero-type bar design, the bars extend forward to allow the hand grips to be located forward of the bicycle handlebar stem. The result is that the aero bar design allows a cyclist to place his arms forward of the bicycle stem which allows him to decrease his frontal surface and rest his arms forward of the handlebar stem. Thus, the result of this Aero-bar type design and its variations have revolutionized the world of cycling.

Notwithstanding the aerodynamics that the aero-type bar has allowed a cyclist too achieve, it has not been able to achieve optimum aerodynamics by its failure to totally eliminate the air drag generating pocket created by a cyclist's upper torso, shoulders and extended arms. The torso pocket results in a continual drag which exponentially increases as the cyclist reaches higher speeds. Thus, the cyclist is forced to exert more energy to overcome the additional drag.

In addition, the aero-bar type position still requires that a cyclist consume energy while supporting the weight of his upper body with his forearms. Finally, The aerobar type design, due to its forearm supports which keep a cyclist's shoulders in an upright position, does not achieve the lowest aerodynamic tuck that can be achieved by a cyclist while riding a bicycle.

In an attempt to solve the drag producing effects created by a cyclist's upper torso, shoulders, and arms many variations and different designs of aerobar technology have been created. In an attempt to minimize the drag created by a cyclist arms, versions of aero-bars were invented which have gradually narrowed the distance between a cyclist hands to create an arrow head type formation that will cut through the air more efficiently. In fact, one invention actually allowed a cyclist to overlap his hands while grasping a aerobars that joined together at its most forward position. (U.S. Pat. No. 5,145,210).

However, the attempts to close the distance between a cyclists hands have not succeeded in addressing the drag created by the rider's arms. Due to control problems that are created when the hands are too close together and a need to keep the chest expanded to facilitate breathing, a space between a rider's hands has been the preferred method of aero-bar designers. Thus, the arms continue to create air drag when using the aero bar design.

Also, efforts to minimize the frontal surface created by the elevated upper torso have resulted in aerobar designs that have extended forwardly the hand grips to a much greater degree. These latest innovations have further improved aerodynamics but control and leverage have suffered. Due to the greater forward extension in which the arms are placed by the extended aero bar, a cyclist is put in a poor position to control the bicycle when attempting to steer the bicycle or handle wind gusts or cross wind situations, thus, hindering aerodynamic efficiency. In addition, the extended aerobar approach has failed to address the drag created by a cyclist's arms.

Hence, the aero-bar design with all its variations suffer disadvantages in that they have failed to gain optimum and efficient aerodynamics due to the drag created by bicycle rider's exposed upper torso and forwardly extended and spaced arms.

SUMMARY OF THE INVENTION

Accordingly, several objects and advantages of my present invention are:

(a) to provide a novel handle & torso support assembly for steering a bicycle that allows a rider to assume a more aerodynamic position by lowering his upper torso when riding a bicycle. This object is accomplished with the novel handle and torso support assembly which allows a cyclist to lower his upper torso and shoulders further in order to eliminate the air drag pocket created by traditional aerobar type systems. The novel handle and support system includes a pair of handle portions extending rearwardly and upwardly from and connected to the bicycles steering post. These novel handles are located so that, they can be grasped by the rider underneath his upper torso, neck and head area. This novel handle position allows a rider to steer & control the bicycle with his hands below his upper body thus allowing the rider to lower his body posture to a degree that eliminates air drag producing upper torso pocket.

(b) to provide a novel handle & torso support assembly which eliminates air drag effects created by a cyclist's extended arms. This object is accomplished with the novel handle and torso support assembly which allows a bicycle rider to tuck his arms underneath his already lowered upper torso thereby eliminating the arm drag created by aerobar type designs which induce a cyclist to project his arms forward, away from his upper torso and into air dragging exposure. This novel handle and torso support system includes a pair of torso support extensions that extend rearwardly and upwardly from its connection with the steering post. These novel support extensions are located so that, they can allow a cyclist to rest his arms underneath his torso and shield his arms from drag creating wind.

(c) to provide an energy saving support assembly which allows a cyclist to rest his upper torso, shoulders, and arms while riding a bicycle thereby conserving energy. This object is accomplished with the rearwardly extended novel torso support extensions which allows a cyclist to assume a novel forward leaning rest position while resting on the support assembly. These novel torso support extensions, which extend rearwardly and upwardly from the steering post, are located so that, a cyclist can rest his upper torso directly on top of his arms which are resting on the torso support extensions.

Hence, further objects and advantages are that with this novel handle and support assembly, a cyclist is enabled to tuck his upper torso lower than aerobar designs, eliminate air drag created by a cyclist extended arms, and allow a cyclist to rest his upper torso and arms and conserve energy. These advantages allow a cyclist to attain higher speeds for longer periods of time due to the novel aerodynamics and to conserve energy for greater endurance to enhance performance during bicycling. Still further objects and advantages will become apparent from a consideration of the ensuing description and drawings.

BRIEF DESCRIPTION OF THE DRAWINGS

For a complete understanding of the present invention, and the advantages thereof, reference is made to the following descriptions taken in conjunction with the accompanying drawings, in which.

DETAILED DESCRIPTION OF THE PRESENT INVENTION

While the present invention will be described in connection with alternate embodiments, it will be understood that it is not intended to limit the invention to these embodiments. To the contrary, it is intended to cover all alternatives, modifications or equivalents as may be included within the spirit and scope of the invention as defined by the legal claims.

Figure 1:
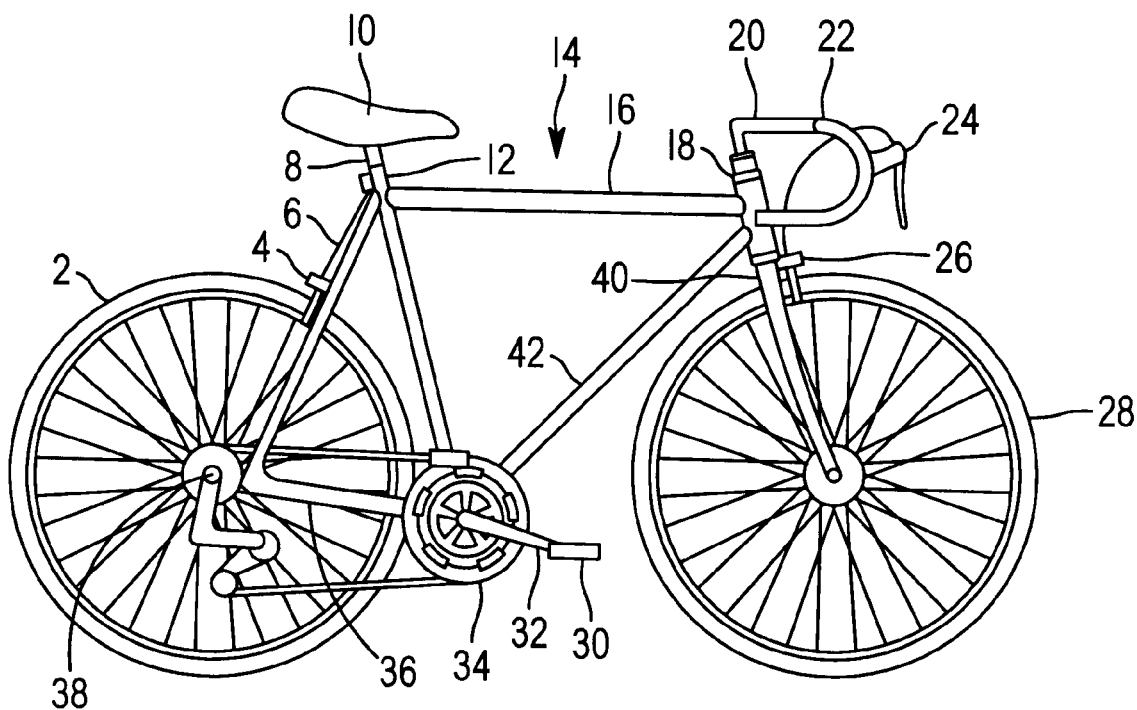
FIG. 1 is a side elevational view of a conventional bicycle.

A traditional bicycle with bicycle handlebars is shown in FIG. 1. The bicycle 14 which includes a triangular shaped frame comprised of a top tube 16, a down tube 44 and a seat tube 12. Seatstays 6 and chainstays 36 join to rigidly secure a rear wheel 2 by its axle 38. Extending from the seat tube 12 is a seat post 8. Mounted atop the seat post 8 is a saddle 10. Seat post 8 may be raised or lowered into the seat tube to accommodate riders of differing heights. The top tube 16 and a down tube 44 extend forwardly to a head tube 18. Journaled within this head tube 18 is a bicycle stem 20. Pedals 30 mounted to cranks 32 operate a drive sprocket 34 and a chain drive 46 in order to propel the bicycle.

Figure 2:
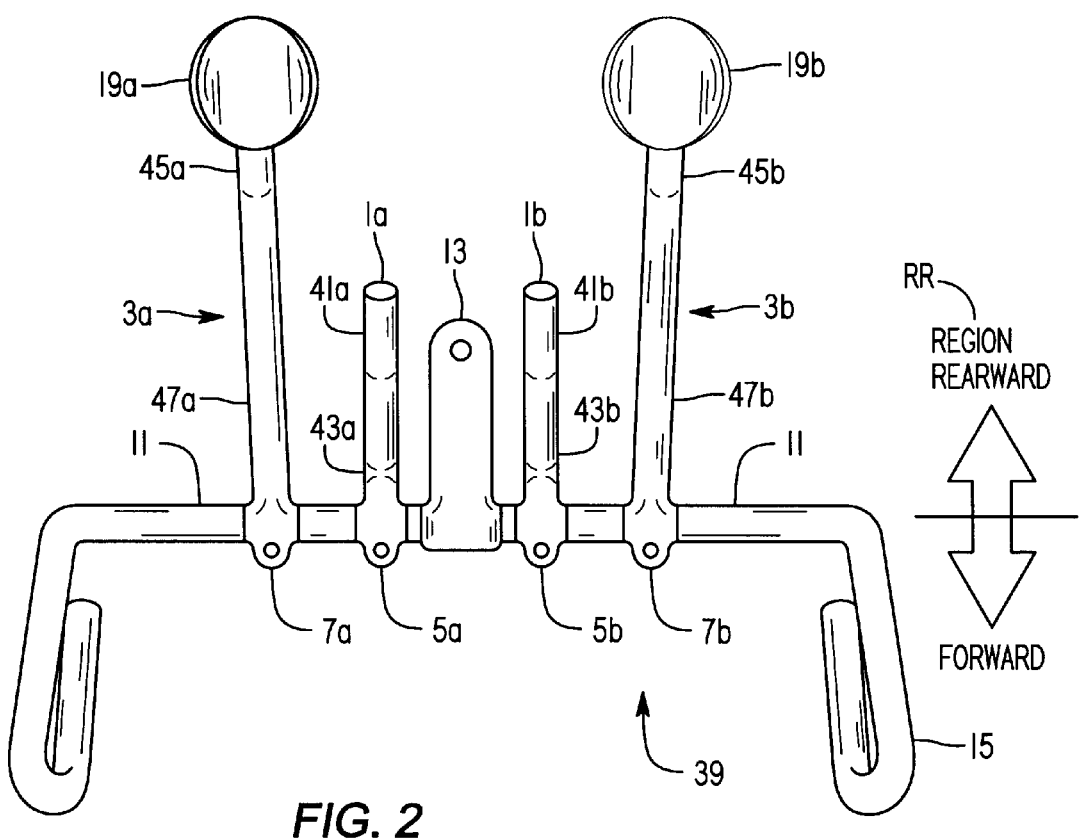
FIG. 2 is a top view of an embodiment of the novel handle and torso support assembly attached to a conventional bicycle handlebar.

Turning now to FIG. 2, illustrated is a top view of an embodiment of the novel handle and torso support assembly attached to a conventional bicycle handlebar. The bicycle handlebar 15 includes a crossbar portion 11 that is connected to a bicycle stem 13. The novel handle and torso support assembly includes a first and second handle extensions 1a, 1b, respectively, and first and second torso support extensions 3a, 3b, respectively. In the illustrated embodiment, the first and second handle extensions 1a, 1b further include first and second ends 41a, 41b and 43a, 43b, respectively. Attached to the second ends 43a, 43b of the first and second handle extensions 1a, 1b are first and second handle clamps 5a, 5b, respectively. The first and second handle clamps 5a, 5b are clamped on to the crossbar portion 11 of the bicycle handlebar 15 and extend rearwardly and upwardly to a region rearward RR from the crossbar portion 11 poximate to the bicycle stem 13. The orientation of the first and second handle extensions 1a, 1b define a rider's position whereby the rider's hands are located under the rider's upper torso when the rider is using the handle extensions to steer a bicycle.

The first and second torso support extensions 3a, 3b further include first and second ends 45a, 45b and 47a, 47b, respectively. Attached to the second ends 47a, 47b of the first and second torso support extensions 3a, 3b are first and second torso clamps 7a, 7b, respectively. The first and second torso clamps 7a, 7b are clamped on to the crossbar portion 11 of the bicycle handlebar 15 and extend rearwardly and upwardly to the region rearward RR from the crossbar portion 11. A first and second forearm supports 19a, 19b are also attached to the first ends 45a, 45b using conventional attachment techniques, such as clamps. The forearm supports are conventional supports that are well known in the art.

In accordance with the invention, a forward leaning rest position is encouraged by the rider placing his forearms on the forearm supports 19a, 19b, which are clamped on to the torso support extensions 3a, 3b, and resting his upper torso on top on his coiled arms while grasping the handle extensions 1a, 1b. To this end, the rider achieves a more aerodynamic position because his upper torso and arms exposure to the wind is minimized. Furthermore, a rider conserves energy while riding the bicycle in the forward leaning rest position due to not having to exert energy to support his upper body while it is resting on his coiled arms.

Figure 4:
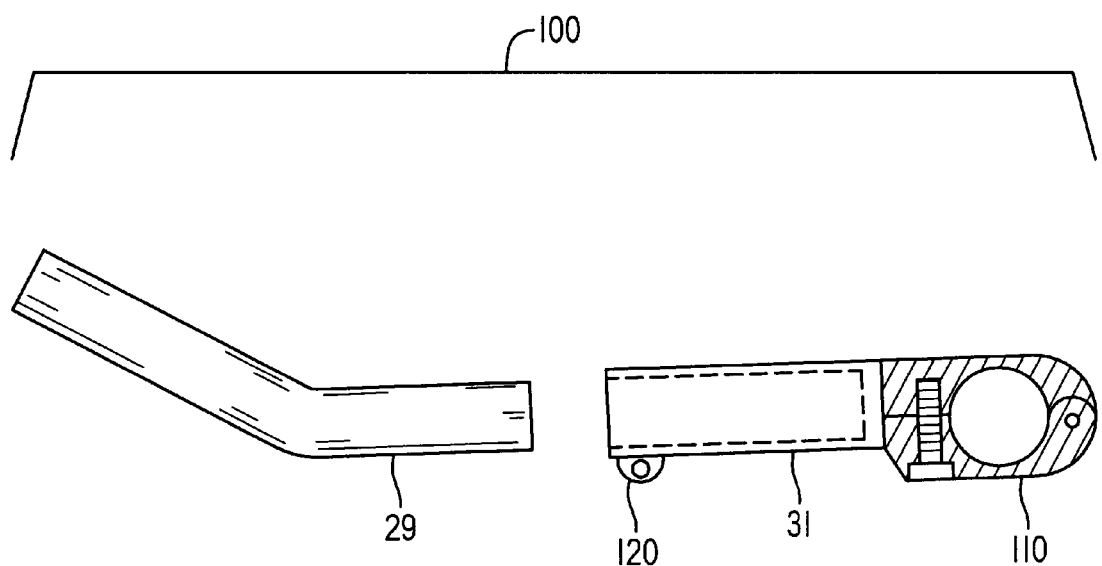
FIG. 4 is a side view of an embodiment of a novel extendable handle extension.

A variety of different rider hand positions are provided by the handle extensions 1a, 1b, each with their corresponding handle clamps 5a, 5b or with the extendable hollow handle 29 and female connector piece 31 shown in FIG. 4. FIG. 4 illustrates a side view of an embodiment of a novel extendable handle extension 100. The extendable handle extension 100 includes a hollow handle 29 and a connector piece 31 that are analogous to the first and second ends 41a, 41b and 43a, 43b, respectively, of the first and second handle extensions 1a, 1b illustrated in FIG. 2. The connector piece 31 further includes a handle clamp 110 and a connector clamp 120.

The handle extensions 1a, 1b and 100 clamping mechanisms, i.e., handle clamps 5a, 5b and 110 allows a rider to adjust the height of the handle extensions by pivoting the handle extensions back and forth around the crossbar portion 11 and fastening the bolt in each handle clamps 5a, 5b and 110 to achieve the handle position preferred by the bicycle rider. Moreover, the hollow handle extending element 29 insertable into the female connector clamp 120 of the connector piece 31 provide for various length positions by a small bolt inserted into the opened threaded contracting element located on each female connector clamp 120 of the connector piece 31. In addition, the handle clamps 5a, 5b and connector piece 31 can slide sidewardly so as to form a variety of width positions so that a rider can choose his preferred handle width for steering.

Figure 5:
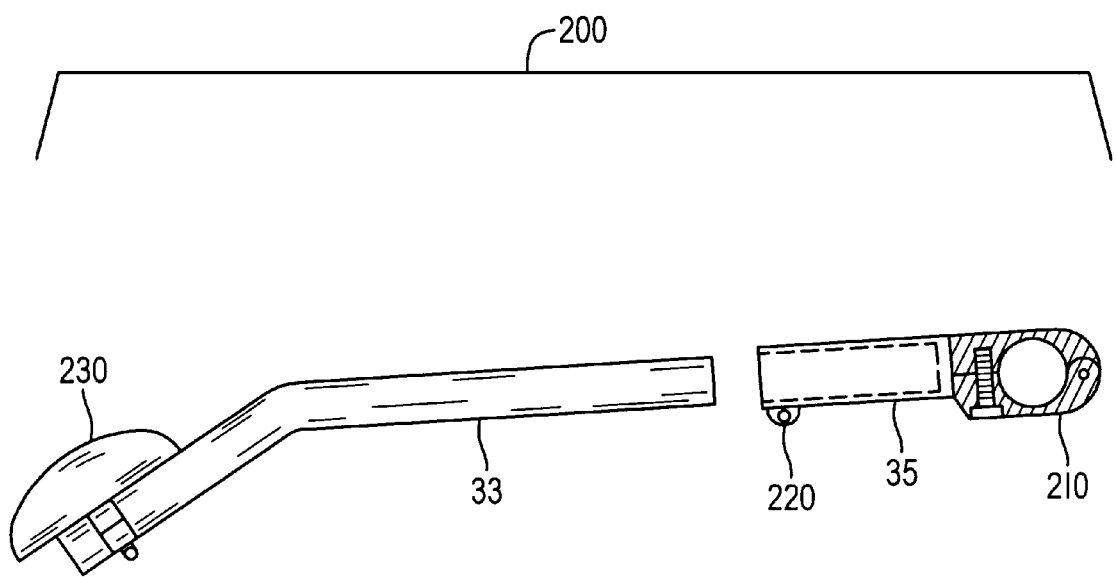
FIG. 5 is a side view of an embodiment of a novel extendable torso support extension.

A variety of torso extension positions can also be obtained with the torso support extensions 3a, 3b, each with their corresponding torso clamps 7a, 7b, or with the extendable hollow torso support 33 and female connector piece 35 shown in FIG. 5. FIG. 5 illustrates a side view of an embodiment of a novel extendable torso support extension 200. The extandable torso support extension 200 includes a hollow torso support 33 and a connector piece 35 that are analogous to the first and second ends 45a, 45b and 47a, 47b, respectively, of the first and second torso support extensions 3a, 3b illustrated in FIG. 2. The connector piece 35 further includes a torso clamp 210 and a connector clamp 220. The hollow torso support 33 also includes a conventional forearm support 230.

The torso support extensions clamping mechanisms 7a, 7b and 210 allows a rider to adjust the height of the torso support extensions 3a,3b and 200 by pivoting up or down and fastening the bolt in each torso clamp 7a, 7b and 210 to achieve the height positions preferred by the cyclist. Moreover, the hollow torso support 33 combined with the female connector clamp 220 of the connector piece 35 provide for various length positions by fastening a small bolt insertable into the opened threaded contracting element located on each female connector clamp 220 of the connector piece 35. In addition, the torso clamps 7a, 7b and the connector piece 35 can slide sidewardly so as to form a variety of width positions so that a rider can choose his preferred width for placing his arms.

Figure 3:
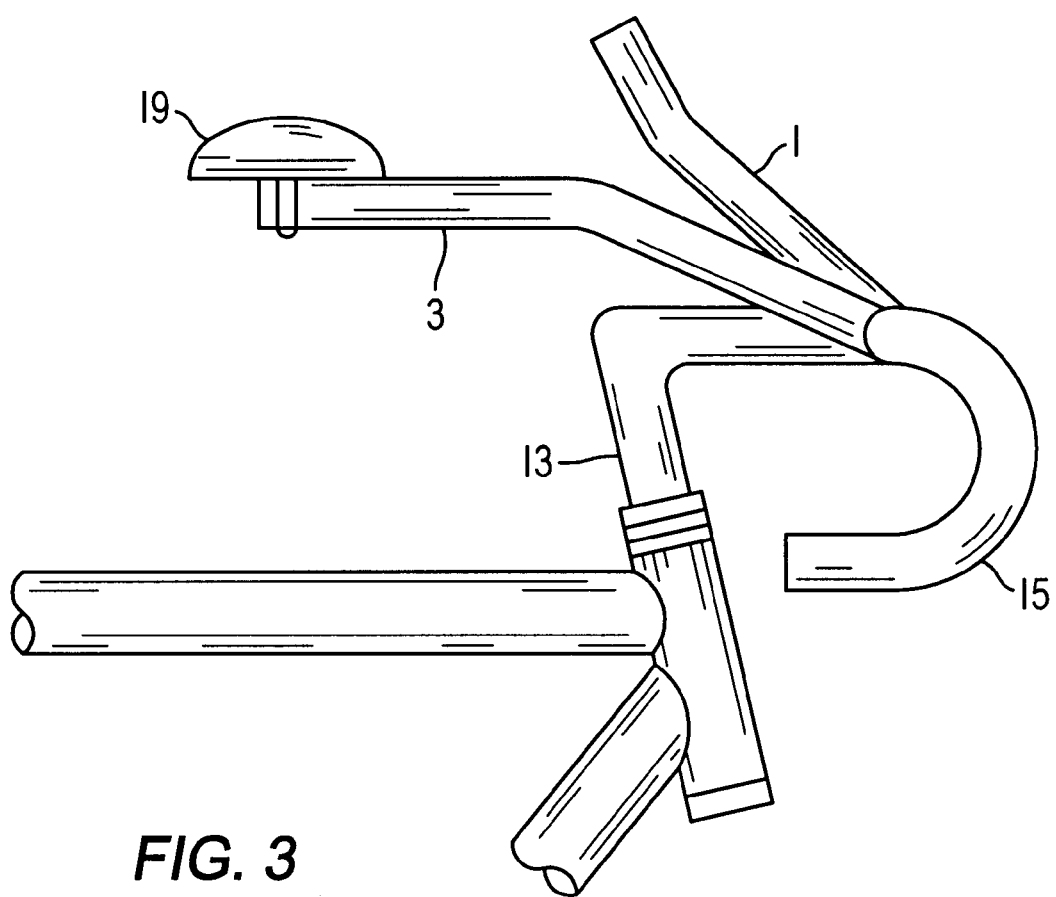
FIG. 3 is a side elevational view of an embodiment of the present invention shown in FIG. 2 attached to a conventional bicycle handlebar.

While the handle extensions 1a, 1b and 100, extend rearwardly and upwardly from the handlebars, it is preferable for the handle extensions 1a, 1b and 200 to raise up at the free end, i.e., first ends 41a, 41b and hollow handle 29, of each handle extension 30 degree(s) above the plane defined by the longitudinal axis of the handle extension on a radial bend of three inches as shown in FIGS. 3 and 4. This upward angle enables a rider to naturally grasp the handle extensions for better comfort and control while steering. Furthermore, the torso support extensions 3a, 3b and 200, also extend rearwardly and upwardly from the handle bars. However, its preferable for the torso support extensions 3a, 3b and 200 to angle down at the free end, i.e., first ends 45a, 45b and hollow torso support 33, of each torso support extension 30 degree(s) above the plane defined by the longitudinal axis of the torso support extension on a radial bend of five to eight inches as shown in FIGS. 3 and 5. This angle prevents the torso supports from interfering with the rider's knees while cycling. Conventional forearm supports are attached with suitable clamping elements on the free end of each torso support extension for rider comfort. Important to note, that the handle and torso clamps 5a, 5b, 7a, 7b, 110, and 210, which are affixed to the crossbar 11 of the bicycle handlebar, can be adjusted with conventional Allen wrenches using the bolts which are threaded into each clamping mechanism. In addition, each bolt of the clamps 5a, 5b, 7a, 7b, 110 and 210, while facing up can be accessed by the rider even while riding in order to raise both torso supports to provide sufficient knee room for the rider while riding the bicycle standing on the pedals.

The handle extensions and the torso support extensions can be constructed of cylindrical tubing of aluminum or other suitable material.

Figure 6:
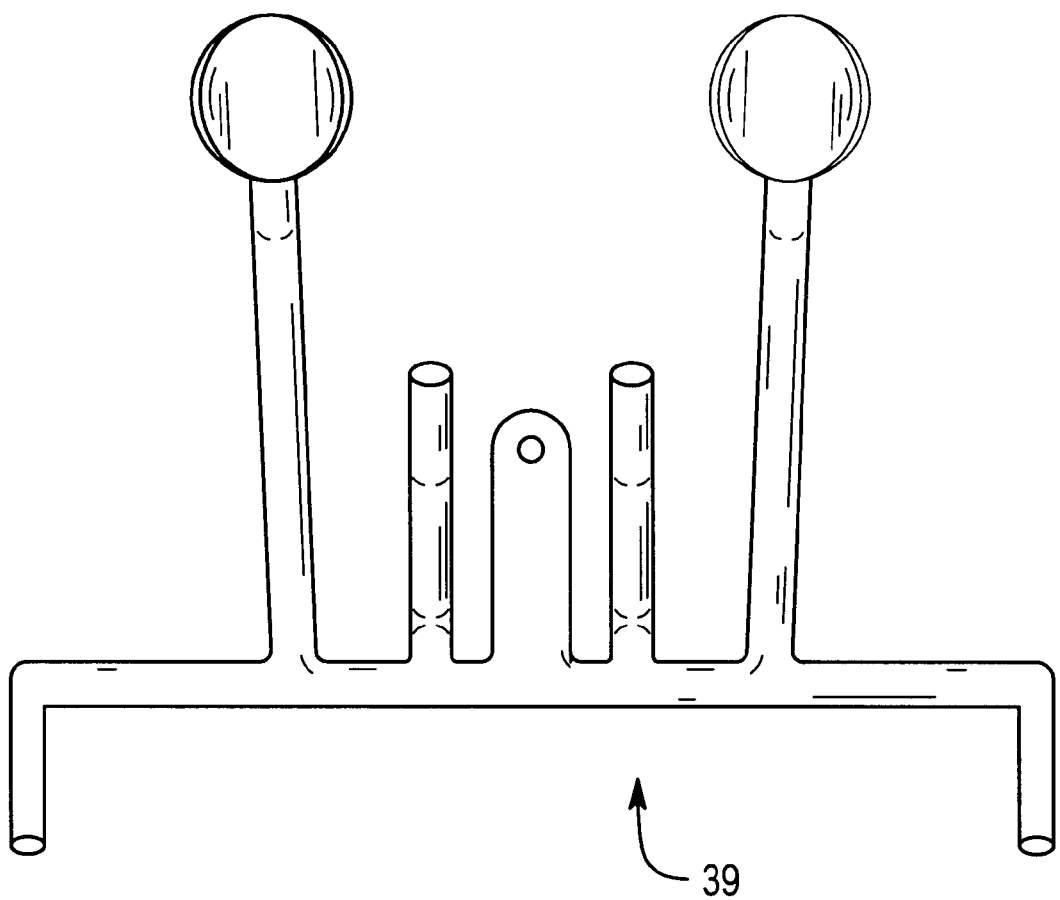
FIG. 6 is a top view of an embodiment of a continuous handlebar constructed using the principles of the present invention.

An alternative embodiment of the present handle and torso support assembly is shown in FIG. 6. FIG. 6 illustrates a top view of an embodiment of a continuous bicycle handlebar 300 constructed using the principles of the present invention. The continuous bicycle handlebar 300 includes a crossbar portion 310 and a bicycle stem 320 that extends rearwardly from the crossbar portion 310. Also extending rearwardly and upwardly to a region rearward from the crossbar portion 310 are first and second handle extensions 330a, 330b, respectively. The continuous bicycle handlebar 300 further includes first and second torso support extensions 340a, 340b, respectively, that also extend rearwardly and upwardly from the crossbar portion 310. Also included in the illustrated embodiment are first and second hand grip portions 350a, 350b, respectively. The first and second hand grip portions 350a, 350b are conventional handgrips that are widely employed on conventional bicycle handlebars. The rearward orientation of the handle extensions 330a, 330b defines a rider's position whereby the rider's hands are located under the rider's upper torso when the rider is steering the bicycle using the handle extensions.

Thus, with the continuous bicycle handlebar 300 consisting of its own rearwardly and upwardly orientated handle and torso support extensions of predetermined length customized to an individual rider's specifications, the continuous bicycle handlebar 300 obviates the need for the heavier clamping mechanisms 5a, 5b, 7a, 7b, 110, and 210 of the attachable embodiment of the handle and torso support assembly illustrated in FIGS. 2, 4 and 5. Another advantage of the continuous bicycle handlebar 300 is that a rider can choose to use a cross bar portion with up turned bar ends, in lieu of the traditional bicycle handlebars, further eliminating weight.

From the above, the reader can see that the handle and support extension assembly provides a cyclist the means to assume a forward leaning rest position in which greater aerodynamics can be achieved than with aero type handlebars. Furthermore, the handle & support assembly allow a cyclist to rest his upper body while riding in the forward leaning rest postion because the novel torso support extensions allow a rider to place his arms on the forearm pads attached to the torso supports and then rest his toso on top of his coiled arms while steering the bicycle using the novel handle extensions.

What is claimed is:

1. In combination with a bicycle handlebar having a crossbar portion connected to a bicycle stem, a handle and torso support assembly, comprising:

a pair of handle extensions, each of said pair of handle extensions having first and second ends, each of said second ends having a handle clamp affixed thereto;

clamping means for securing said handle clamps to said crossbar portion, said handle extensions extending rearwardly and upwardly to a region rearward from said crossbar portion to define a rider position whereby said rider's hands are located under said rider's upper torso when steering a bicycle using said pair of handle extensions; and at least one torso support extension said torso support extension including:

first and second ends;

a forearm support located at said first end of said torso support extension; and a torso clamp located at said second end of said torso support extension to secure said torso support extension to said crossbar portion said torso support extension extending upwardly to said region rearward from said crossbar portion.

2. The handle and torso support assembly as recited in claim 1 wherein said handle and torso clamps of said pair of handle and said torso support extensions, respectively, pivot about said crossbar portion to define a plurality of height positions.

3. The handle and torso support assembly as recited in claim 1 wherein said handle and torso clamps of said pair of handle and said torso support extensions, respectively, are located along the length of said crossbar portion to define a plurality of width positions.

4. The handle and torso support assembly as recited in claim 1 wherein each of said pair of handle extensions extends in length.

5. The handle and torso support assembly as recited in claim 1 wherein said pair of handle extensions and said torso support extension are constructed using cylindrical aluminum tubing.

6. The handle and torso support assembly as recited in claim 1 wherein said first ends of said pair of handle extensions respectively rise up at an angle above the plane defined by the longitudinal axes of said handle extensions.

7. The handle and torso support assembly as recited in claim 1 wherein said first end of said torso support extension angles down at thirty degrees below the plane defined by the longitudinal axis of said torso support extension with a radial bend in the range of from five to eight inches.

8. The handle and torso support assembly as recited in claim 1 wherein said torso support extension extends in length.

9. A continuous bicycle handlebar mountable to a bicycle stem, comprising:

a crossbar portion connectable to said bicycle stem;

a pair of handle extensions extending rearwardly and upwardly to a region rearward from said crossbar portion to define a rider position whereby said rider's hands are located under said rider's upper torso when steering a bicycle using said pair of handle extensions; and at least one torso support extension extending upwardly to said region rearward from said crossbar portion.

10. The continuous bicycle handlebar as recited in claim 9 further comprising at least one hand grip portion.

* * * * *